United States Patent Office 2,772,241
Patented Nov. 27, 1956

2,772,241

HALOPHOSPHATE PHOSPHORS

Peter Whitten Ranby, London, England, assignor to Thorn Electrical Industries Limited, London, England, a company of Great Britain No Drawing. Application March 10, 1951, Serial No. 215,011

Claims priority, application Great Britain March 14, 1950

2 Claims. (Cl. 252—301.4)

This invention relates to luminescent materials for use in fluorescent discharge lamps, cathode ray tube screens and X-ray screens. The object of the invention is to provide new luminescent materials.

According to this invention, a method of preparing an artificial luminescent material includes the step of preparing a matrix by subjecting to heat treatment a mixture consisting of one or more of the phosphates of one or more of the metals calcium, strontium, barium, zinc and cadmium, one or more of the fluorides of said metals or one or more of the chlorides of said metals together with more than an equal quantity of one or more of the fluorides of said metals, and an activator consisting of silver or silver plus manganese, or a compound or compounds of such activator, the proportions of metal, phosphorus and halogen in the resultant matrix being such that the ratio of the number of metallic atoms to the number of phosphorus atoms lies between and includes the values 50:50 and 50:30, and the ratio of the number of metallic atoms plus the number of phosphorus atoms to the number of halogen atoms lies between and includes 1:0.05 and 1:0.5, the silver content being between 0.01 percent and 5 percent, both inclusive, and the manganese content, if manganese is present, not exceeding 10 percent, both being by weight, of the matrix.

Also according to the invention an artificial luminescent material consists of a matrix prepared by subjecting to heat treatment a mixture consisting of one or more of the phosphates of one or more of the metals calcium, strontium, barium, zinc and cadmium, one or more of the fluorides of said metals or one or more of the chlorides of said metals, together with more than an equal quantity of one or more of the fluorides of said metals, and an activator consisting of silver or silver plus manganese, or a compound or compounds of such activator, the proportions of metal, phosphorus and halogen in the resultant matrix being such that the ratio of the number of metallic atoms to the number of phosphorus atoms lies between and includes the values 50:50 and 50:30, and the ratio of the number of metallic atoms plus the number of phosphorus atoms to the number of halogen atoms lies between and includes the values 1:0.05 and 1:0.5, the silver content being between 0.01 percent and 5 percent, both inclusive, and the manganese content, if manganese is present, not exceeding 10 percent, both being by weight, of the matrix.

The number of metallic atoms in the above defined ratios comprises the number of metal atoms in the activating material plus the number of atoms of the other metal or metals present.

For the purpose of terminology, it is convenient to refer to materials according to the present invention as halophosphates and, though it is believed that the calcium, strontium and barium halophosphates of the present invention have an apatite structure, it will be understood that the halophosphate materials in accordance with the invention are not limited to known crystal forms such as apatite and wagnerite.

In one example of the invention, calcium monohydrogen phosphate $CaHPO_4$, calcium fluoride $CaF_2$, and calcium carbonate $CaCO_3$ or diammonium hydrogen phosphate $(NH_4)_2HPO_4$, are heated together with a compound of silver and a compound of manganese in such proportions as to yield a luminescent material having a composition in which the ratio of the number of atoms of (Ca+Mn+Ag) to the number of atoms of P lies between and includes 50:50 and 50:30 and the ratio of the number of atoms of F to the number of atoms of (Ca+Mn+Ag+P) lies between and includes 0.05:1 and 0.5:1. Other starting materials may equally well be used to yield the same resultant material. Thus a mixture of a calcium compound which decomposes upon heating to yield calcium oxide and volatile by-products and an ammonium phosphate such as $(NH_4)_3PO_4$, $(NH_4)_2HPO_4$ or $NH_4H_2PO_4$ may be used to replace $CaHPO_4$ and $CaCO_3$ in the initial mixture. Similarly, the calcium fluoride may be replaced in the initial mixture by mixtures of substances such as $CaCO_3$ and $NH_4F$ which form $CaF_2$ and volatile by-products on heating.

In the above-quoted example of a luminescent material in accordance with the invention, the calcium can be wholly or partially replaced by a chemically-equivalent amount of one or more of the bivalent metals strontium, barium, zinc and cadmium. Also, in such a material, the fluorine can be partially replaced by chlorine.

The silver may be introduced into the initial mixture in the form of a silver compound such as the chloride, nitrate, sulphate or phosphate. The concentration of silver incorporated in the initial mixture lies between 0.01 and 5 percent by weight of the matrix. When manganese is present as a secondary activator the luminescent emission is of longer wavelength than when silver alone is used as the activator. The manganese may be introduced into the initial mixture in the form of a manganese compound such as the phosphate, fluoride or sulphate, the concentration of manganese in the final product being not more than 10 percent by weight of the matrix.

All the materials used should be of the high degree of purity which is recognised to be necessary for the preparation of phosphors. The luminescent material results after a suitable heat treatment of the initial mixture of raw materials at a temperature generally between 700 and 1300° C.

Owing to the ease of reduction of silver compounds to the metallic state it is desirable to avoid strongly reducing conditions during the preparation. Similarly a strongly oxidising atmosphere should be avoided to prevent excessive oxidation of manganese when the latter is present.

The calcium, strontium and barium halophosphates of the present invention are brightest when prepared under conditions which reduce to a minimum the chance of forming any hydroxy- or oxy-apatite. Thus it is often advantageous to start with a mixture containing more fluorine, or fluorine and chlorine, than would normally be required for a normal fluo- or fluo-chloro-apatite.

Methods of preparing a luminescent material in accordance with the present invention will now be described by way of examples.

Calcium monohydrogen phosphate is prepared by mixing aqueous solutions of calcium chloride and diammonium hydrogen phosphate of 2 molar concentrations in equivalent proportions, filtering off the precipitate, washing with distilled water and drying at 160–220° C. Manganese phosphate is similarly prepared from aqueous solutions of manganese chloride and diammonium hydrogen phosphate.

*Example 1*

In the first example, 7.8 gm. of calcium monohydrogen phosphate ($CaHPO_4$), 0.5 gm. of calcium carbonate, 1.7 gm. of calcium fluoride and 0.06 gm. of silver chloride are ground together and heated in a covered crucible for half an hour at 1150° C., and then ground and reheated for a further half hour at 1150° C. The resulting material shows a blue luminescence under excitation by 2537 A. U. radiation.

*Example II*

In this example, the method is modified only by the addition of 0.3 gm. of manganese chloride ($MnCl_2.4H_2O$) to the mixture before heating. The final material shows a pinkish yellow luminescence under excitation by 2537 A. U. radiation.

*Example III*

The method of the first example is modified by the replacement of the 1.7 gm. of calcium fluoride with 2.75 gm. of strontium fluoride. The resulting material shows a yellow luminescence under excitation by 2537 A. U. radiation.

*Example IV*

In this example, 10.0 gm. of strontium carbonate, 7.32 gm. of diammonium hydrogen phosphate (($NH_4)_2HPO_4$), 2.75 gm. of strontium fluoride, 0.06 gm. of silver chloride, and 0.3 gm. of manganese chloride ($MnCl_2.4H_2O$) are ground together and heated for half an hour at 1150° C. in a covered crucible. The material is then ground and reheated for a further half hour at 1150° C. The resulting material shows a yellow luminescence under excitation by 2537 A. U. radiation.

*Example V*

In this example 13 gm. of barium carbonate, 7.32 gm. of diammonium hydrogen phosphate (($NH_4)_2HPO_4$), 3.85 gm. of barium fluoride, 0.06 gm. of silver chloride and 0.3 gm. of manganese chloride ($MnCl_2.4H_2O$) are ground together and heated for half an hour at 1100° C. in a covered crucible, and thereafter ground and reheated for a further half hour at 1100° C. The resulting material has a yellow-pink luminescence under excitation by 2537 A. U. radiation.

*Example VI*

The method of the fifth example is modified by replacing the 13 gm. of barium carbonate by 5.4 gm. of zinc oxide and the 3.85 gm. of barium fluoride by 2.26 gm. of zinc fluoride. The heating is carried out at 950° C. instead of 1150° C. and the resulting material shows a pink-red luminescence under excitation by 2537 A. U. radiation.

*Example VII*

In the seventh example 7.7 gm. of cadmium carbonate, 4.89 gm. of diammonium hydrogen phosphate (($NH_4)_2HPO_4$), 2.2 gm. of cadmium fluoride, 0.04 gm. of silver chloride and 0.2 gm. of manganese chloride ($MnCl_2.4H_2O$) are ground and heated together for half an hour at 950° C., and thereafter ground and reheated at 950° C. for a further half hour. The resulting material shows an orange pink luminescence under excitation by 2537 A. U. radiation.

I claim:

1. An artificial luminescent material consisting essentially of a halophosphate of a metal selected from the group consisting of calcium, strontium, barium, zinc and cadmium, the halogen in the halophosphate being selected from the group consisting of fluorine, and fluorine plus chlorine, the amount of fluorine being greater than the amount of chlorine, the halophosphate being activated by an activator selected from the group consisting of silver, and silver and manganese together, the proportions of the ingredients being such that the gram-atom ratio of the metals to phosphorus is between 50/50 and 50/30 inclusive, the gram-atom ratio of metals-plus-phosphorus to halogen being between 1/0.05 and 1/0.5, inclusive, the silver content being between 0.01% and 5%, inclusive, by weight, and the manganese content being between zero and 10%, inclusive, by weight.

2. An artificial luminescent material consisting essentially of a halophosphate of at least one of the metals in the group consisting of calcium, strontium, barium, zinc and cadmium, the halogen in the halophosphate being selected from the group consisting of fluorine, and fluorine plus chlorine, the amount of fluorine being greater than the amount of chlorine, and an activator, selected from the group consisting of silver, and silver and manganese together, the proportions of the ingredients being such that the gram-atom ratio of the metals to phosphorus is between 50/50 and 50/30 inclusive, the gram-atom ratio of metals-plus-phosphorus to halogen being between 1/0.05 and 1/0.5, inclusive, the silver content being between 0.01% and 5%, inclusive, by weight, and the manganese content being between zero and 10%, inclusive, by weight.

References Cited in the file of this patent

UNITED STATES PATENTS

| 2,488,733 | McKeag | Nov. 22, 1949 |

FOREIGN PATENTS

| 603,343 | Great Britain | June 14, 1948 |
| 645,502 | Great Britain | Nov. 1, 1950 |